Aug. 21, 1928.  1,681,339
R. E. HALL
METHOD AND APPARATUS FOR DETERMINATION OF THE CONCENTRATION
OF TURBID SUSPENSIONS
Filed Dec. 13, 1924
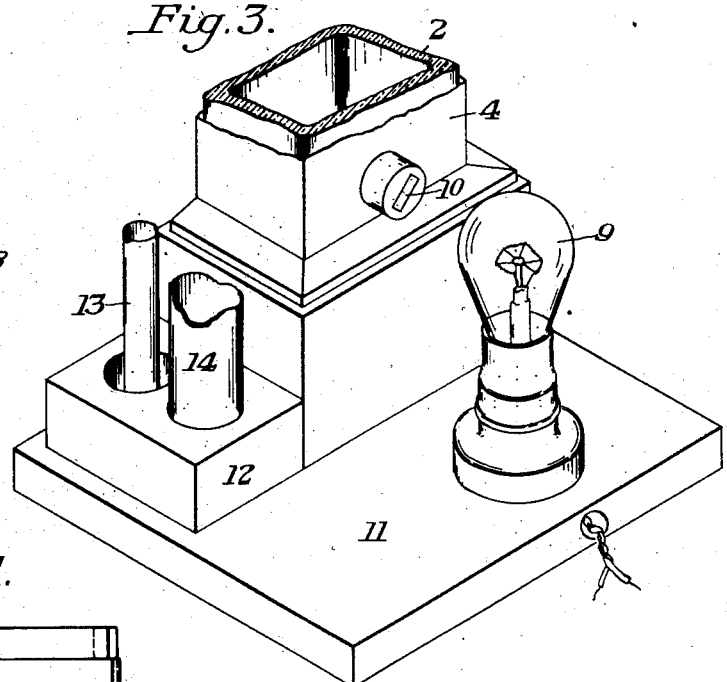
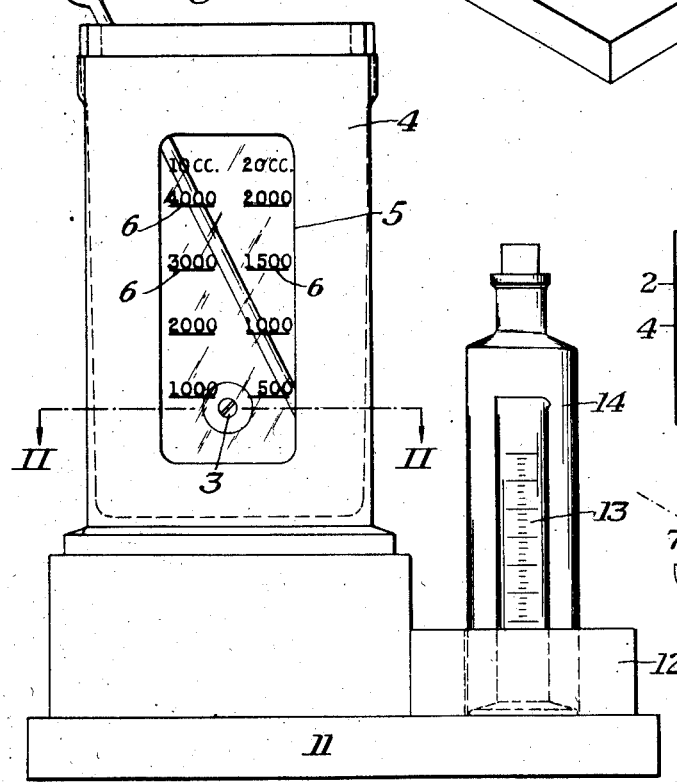
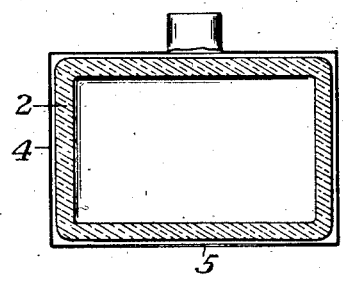
INVENTOR
Ralph E. Hall
by his attorneys
Byrnes, Stebbins & Parmelee Patented Aug. 21, 1928.

1,681,339

UNITED STATES PATENT OFFICE.

RALPH E. HALL, OF PITTSBURGH, PENNSYLVANIA, ASSIGNOR TO JOHN M. HOPWOOD, OF DORMONT BOROUGH, PENNSYLVANIA.

METHOD AND APPARATUS FOR DETERMINATION OF THE CONCENTRATION OF TURBID SUSPENSIONS.

Application filed December 13, 1924. Serial No. 755,721.

The present invention relates to a method and apparatus for determining the concentration of finely divided material suspended in a liquid and more particularly to those determinations which should be made rapidly and accurately by non-technical operators; for example, the determination of the concentration of sulphates in boiler feed water.

It is well known, in the art to which the present invention relates, that a clear solution of a precipitate-forming material may be rendered turbid by bringing the material out of solution in the form of an insoluble precipitate by the use of a suitable reagent. The turbidity results from the suspension of the insoluble precipitate and must perforce depend upon the concentration of solutions employed. A good example of such a procedure is the precipitation of a sulphate by the use of barium chloride. The sulphate in solution will react with the barium chloride to form barium sulphate which is insoluble and in suspension, renders the solution turbid. For ordinary purposes it may be said that all of the sulphate in such cases will be precipitated. It will be readily understood, therefore, that the concentration of the precipitate will represent a measure of the precipitate forming material present in the original solution.

Heretofore it has been common practice to test for concentration of suspended material by comparing the turbidity of a suspension of unknown concentration with the turbidities of a number of suspensions of known concentrations. In this analysis the liquids are placed in similar long glass cylinders, the heights of the liquids are made equal, and the comparison is made by looking through the cylinders longitudinally toward a suitable light source. This method is objectionable from several viewpoints, being unduly refined for certain determinations, and requiring some technical ability on the part of the operator. Furthermore, standard solutions of comparison must be prepared, and they must be of concentrations closely approximating that of the unknown liquid or the judgment of the operator will represent a very uncertain factor.

It has also been proposed to determine the degree of turbidity by finding the thickness of liquid which represents the limit of distinct visibility of an object when viewed through the liquid. The thickness of liquid required to render the object indistinct will depend upon the concentration of suspended matter present. This principle has been applied in two general ways: namely, that of lowering an object into the liquid and below the surface until it becomes indistinct when viewed from the surface, and that of varying the thickness of liquid in a transparent container until distinct visibility of an object viewed through the container and its contents becomes incipient. In any case, irrespective of the particular mode of application, the devices which employ a varying thickness of liquid to obscure an object and which depend upon the extent of said thickness as a measure of the concentration of the suspended matter present are objectionable from the standpoint of diminishing accuracy with increasing concentration. At high concentrations a small increment in the thickness of liquid may be difficult to determine with ordinary measuring devices but may represent a substantial change in the proportion of suspended matter present.

My method eliminates the objection of inaccuracy at high concentrations and may be quickly performed, in an easily portable apparatus, by an unskilled operator. I preferably provide for observing a luminous object against a dark background through a fixed thickness of turbid liquid. A predetermined quantity of the liquid to be tested is placed in a transparent container. If it be a clear solution, as in the case of boiler feed water, the precipitate forming material is brought out of solution, by the use of suitable reagents, in the form of insoluble compounds. It will be understood that sufficient of the precipitate must be present to render the luminous object indistinct when viewed through the container and suspension. I then provide for diluting the suspension with a clear, miscible, non-precipitating liquid until the luminous object becomes distinct when viewed through the container and its contents. Homogeneity is insured by stirring from time to time. By the provision of a constant light source and a constant thickness of liquid I prescribe that the luminous object shall come to a point of incipient distinctness at one, and only one, degree of concentration of precipitate. That is, at the completion of every test the proportion of precipitate to liquid is the same in all cases. By the use of suspensions of known concentrations, the quantity of liquid (fixed quantity of test liquid plus variable quantity of diluent) to meet the final conditions is determined for a number of concentrations, and the front of the container is graduated in accordance therewith. The graduations are usually calibrated as parts of precipitate per million of test liquid. The analysis is reduced, then, to the simple operations of placing a fixed quantity of liquid to be tested in the container, bringing the precipitates out of solution by the use of suitable reagents, diluting the resulting turbid suspension with a clear, miscible liquid until the luminous object becomes distinct, and lastly reading the results from the graduations on the front of the container.

In the preferred form of apparatus, I provide a glass container having at least two approximately parallel sides and an approximately uniform cross sectional area at various heights. The glass container may be placed in a box which renders the back of the container opaque except for the luminous object. It will be understood that the luminous object referred to may be a simple illuminated slit, a dark object on an illuminated background, or, as I have found most desirable, an illuminated object on a black background. The front of the container is preferably calibrated with more than one scale. Each scale corresponds to a predetermined amount of test liquid to be used. In this manner I provide flexibility of operation in testing liquids of weak concentration or of strong concentration. It will be noted that greater scale length is required for the analyzing of highly concentrated solutions and hence the accuracy is maintained up to any desired standard for these samples as well as for the weaker liquids. Furthermore, by increasing the fixed thickness of liquid through which the luminous object is viewed the accuracy of the determination may be made most exacting, for the scale length will be thereby materially increased and interpolation rendered more accurate.

In the accompanying drawings which illustrate the preferred embodiment of the apparatus of the invention;

Figure 1 is a front elevation of the apparatus;

Figure 2 is a sectional view on the line II—II of Figure 1;

Figure 3 is a perspective view showing the location of the light source with respect to the illuminated object;

Figure 4 is a perspective view partly broken away illustrating the preferred type of illuminated object, and Figure 5 illustrates the type of prism used in the device shown in Figure 4.

The illustrated embodiment of the apparatus comprises a transparent glass jar 2 through which is viewed the illuminated object 3. The glass jar is held in an opaque metal box 4 having a window 5 opposite the illuminated object 3. The graduations or scales 6 are etched on the glass and are exposed through the window 5. The jar 2 is preferably of a substantially uniform cross section at various heights to permit the scale to have substantially uniformly spaced graduations.

The illuminated object 3 is formed by the narrow rounded edge 7 of a triangular glass prism 8. An electric light 9 illuminates the prism, which is given a black coating, except for the rounded edge 7, and the face 10 which is exposed to the light 9. It is found that the prism tends to concentrate the light from the electric lamp at the edge 7 into a sharply defined luminous slit of light. This is preferably disposed at an angle of about 45° to the vertical. The slit of light will be uniformly illuminated, even though the filament positions may vary somewhat with individual light bulbs, and I have found this form of object much more satisfactory than the utilization of a light filament or a flame as the object to be viewed.

The apparatus is rendered conveniently portable by mounting it on a base 11 on which is also placed a block 12 recessed to retain a graduate 13 for measuring the liquid to be tested and a reagent bottle 14 containing a solution suitable for causing the precipitate in the liquid to be tested.

While the apparatus may be used for testing the turbidity of any liquids, it is particularly designed to be used in a boiler room for the rapid yet accurate determination of the sulphate concentration in boiler water.

To make such determination, a known amount of the boiler water is measured out in the graduate 13 and poured into the jar 2. The scales on the jar are illustrated as calibrated for either 10 cc. or 20 cc. of boiler water to be used for the test. If the sulphate concentration is high, 10 cc. is measured out and used, while if the sulphate concentration is low, 20 cc. is preferably used. Then a suitable amount of the precipitate forming reagent from the bottle 14, preferably barium chloride together with sufficient hydrochloric acid to neutralize any alkalinity in the boiler water and render it slightly acid, is added to the jar 2. This precipitates the sulphate as barium sulphate, forming a turbid suspension. Distilled water is gradually added to the jar 2 and the contents stirred until the illuminated light slit 3 becomes sharply visible through the window at the front of the jar 2. The height of the liquid is then read on the proper scale on the front of the jar. This scale is calibrated in parts per million of sulphate, so that the concentration of the sulphate in the boiler water may be read off immediately and without calculation.

The scales etched on the jar are calibrated by using solutions of known sulphate concentration.

The accuracy of the determinations is not materially affected by the degree of concentration of the sulphate solution to be tested, because larger or smaller amounts of the solution may be employed to give the scale readings of the desired magnitude.

The use of the type of prism as shown for the illuminated object permits new lamp bulbs to be used in case the lamp used becomes burned out without materially affecting the accuracy of the readings. The device, once calibrated, may therefore be used indefinitely. Since the readings are direct readings, the determinations may be readily made by the non-technical employees in the boiler room.

The degree of dilution of the suspension is, of course, determined by the increased quantity of liquid added to the original liquid to be tested, this increased quantity of liquid including in the described example not only the distilled dilution water, but also the water added by the barium chloride solution. While it is preferred to read this quantity of liquid directly, as on the scale of the illustrated apparatus, it could be otherwise determined, as, for example, by measuring the volume of the diluant added.

While the preferred embodiment of the invention has been described with particular reference to the determination of the concentration of substances in solution which may be thrown into fine insoluble precipitates, such, for example, as sulphate, the present invention is not limited to its preferred embodiment, but may be employed for the determination of the concentrations of various sorts of suspensions and the comparisons of various kinds of turbidity, within the scope of the following claims.

I claim:

1. The method of determining the concentration of a suspension which comprises diluting a measured quantity of the suspension with a clear, miscible liquid until a luminous object attains a predetermined standard of visibility when viewed through a predetermined thickness of the diluted suspension, viewing the object through the suspension, and measuring the quantity of liquid present when such visibility is obtained whereby the concentration of the suspension may be determined.

2. The method of determining the concentration of a suspension which comprises placing a measured quantity of the suspension in a container having a transparent window therein and having a luminous object at a fixed distance from said window, diluting the suspension with a clear, miscible liquid until the luminous object reaches a predetermined standard of visibility when viewed through the diluted suspension, viewing the object through the suspension, and measuring the quantity of liquid present when such visibility is obtained whereby the concentration of the suspension may be determined.

3. The method of determining the relative turbidity of a liquid which comprises diluting a measured quantity of the turbid liquid with a clear, miscible liquid until a luminous object attains a predetermined standard of visibility when viewed through a fixed thickness of the mixed liquids, viewing the object through the liquids, and measuring the quantity of liquids present at such time whereby the turbidity of the liquid may be determined.

4. The method of determining the amount of precipitate forming compounds present in a solution which comprises adding an excess of a precipitating element to a measured quantity of the solution, diluting the resulting turbid mixture with a clear miscible non-precipitating liquid until a luminous object attains a predetermined degree of visibility when viewed through a fixed thickness of the mixture, viewing the object through the mixture, and measuring the volume of the diluted mixture whereby the concentration of the precipitate forming compounds present in the solution may be determined.

5. The method of determining the concentration of precipitate forming elements in a solution which comprises placing a measured quantity of the solution in a container having a transparent window therein and a luminous object at a fixed distance from the window, adding an excess of a precipitating element to the solution, diluting the resulting turbid mixture with a clear, miscible, non-precipitating liquid until the luminous object attains a predetermined degree of visibility when viewed through the transparent window and the mixture, viewing the object therethrough and measuring the volume of the diluted mixture whereby the concentration of the precipitate forming element present in the solution may be determined.

6. Apparatus for determining the relative turbidities of mixtures, which comprises a container having a transparent side portion, an illuminated object comprising a cylindrical lens mounted opposite thereto, a suitable light source for illuminating said lens, and means for measuring the liquid contents of the containers.

7. Apparatus for determining the relative turbidities of mixtures, which includes a container having a transparent side portion, an illuminated object comprised of the rounded corner of a transparent prism, and a suitable light source for illuminating said object.

8. Apparatus for determining the relative turbidities of mixtures, which comprises a container having a transparent side portion with a graduated scale thereon, an illuminated object comprised of the rounded corner of a glass prism, and a suitable light source for illuminating said object.

9. Apparatus for determining the relative turbidities of mixtures, which comprises a container having a transparent side portion with a graduated scale thereon, an illuminated object comprised of the rounded corner of a glass prism, the entire surface of which prism is rendered opaque with the exception of the said rounded corner and the edge opposite thereto, and a suitable light source for illuminating said object.

In testimony whereof I have hereunto set my hand.

RALPH E. HALL.